US 6,763,854 B1

(12) United States Patent
Peeters et al.

(10) Patent No.: US 6,763,854 B1
(45) Date of Patent: Jul. 20, 2004

(54) POWER LOOM WITH A DEVICE FOR CUTTING OFF A WOOF THREAD

(75) Inventors: Jozef Peeters, Leper (BE); Patrick Puissant, Laarna (BE)

(73) Assignee: Picanol N.V., Iper (BE)

( * ) Notice: Subject to any disclaimer, the term of this patent is extended or adjusted under 35 U.S.C. 154(b) by 158 days.

(21) Appl. No.: 10/069,121

(22) PCT Filed: Aug. 23, 2000

(86) PCT No.: PCT/EP00/08214

§ 371 (c)(1),
(2), (4) Date: Mar. 1, 2002

(87) PCT Pub. No.: WO01/18294

PCT Pub. Date: Mar. 15, 2001

(30) Foreign Application Priority Data

Sep. 2, 1999 (DE) .......................................... 199 41 784

(51) Int. Cl.$^7$ ............................................... D03D 49/50
(52) U.S. Cl. .................... 139/116.2; 139/116.1; 139/450; 139/453; 139/170.4
(58) Field of Search .................... 139/116.1, 116.2, 139/450, 453, 170.4, 263–268

(56) References Cited

U.S. PATENT DOCUMENTS

| 4,588,871 A | * | 5/1986 | Etcheparre et al. ..... 219/121.67 |
| 4,763,492 A | * | 8/1988 | Tibbals, Jr. .................. 66/232 |
| 5,133,196 A | * | 7/1992 | Tibbals, Jr. .................... 66/35 |
| 5,168,143 A | * | 12/1992 | Kobsa et al. .......... 219/121.72 |
| 5,200,592 A | * | 4/1993 | Yabu ...................... 219/121.67 |
| 5,558,207 A | * | 9/1996 | Zabron et al. .............. 198/847 |
| 5,614,115 A | * | 3/1997 | Horton et al. ......... 219/121.67 |
| 6,278,079 B1 | * | 8/2001 | McIntyre et al. ....... 219/121.67 |
| 6,418,974 B1 | * | 7/2002 | King ...................... 139/383 R |
| 6,548,166 B2 | * | 4/2003 | Figuly et al. ............... 428/370 |

FOREIGN PATENT DOCUMENTS

NL        175326 C     10/1984

\* cited by examiner

Primary Examiner—John J. Calvert
Assistant Examiner—Robert Muromoto
(74) Attorney, Agent, or Firm—Bacon & Thomas, PLLC

(57) ABSTRACT

A weaving machine, in particular an airjet loom, which is fitted with a system (16) for cutting a filling thread (12'), which is being held ready for filling insertion, from a filling (12) already beaten into a fabric (10), wherein said system (16) includes a laser.

5 Claims, 1 Drawing Sheet

POWER LOOM WITH A DEVICE FOR CUTTING OFF A WOOF THREAD

Figure 1:
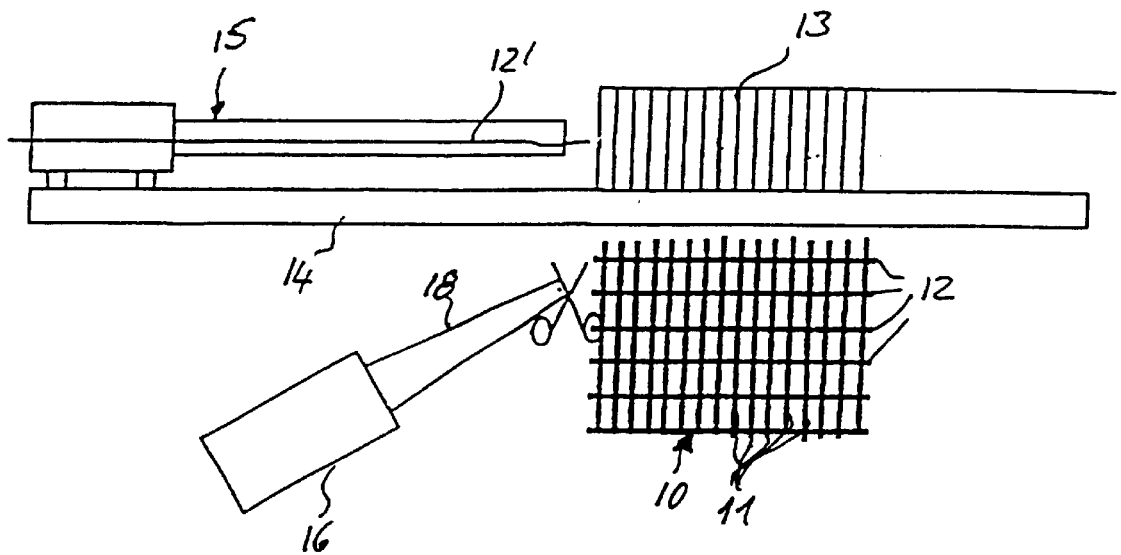

The invention relates to a weaving machine with a system for cutting a filling thread that is held ready for filling insertion from a filling thread already beaten into a woven fabric.

When weaving, a filling thread inserted into a shed is beaten by a reed against the fabric edge, the so-called fell line. Before the filling thread is inserted into the next shed, it is cut off on the insertion side of the shed. The filling thread awaiting insertion should be cut at a precisely defined time in order to control the length of the next inserted filling and/or the thread tension and to satisfy other conditions.

In a known weaving machine of the above described kind (European patent document 0 284 766 A1), the filling thread is cut by a mechanical cutter which contains a drive that is separate from the main machine drive and that in turn is controlled by a programmable control system.

The objective of the invention is to design the system of the above kind so that even more precise timing of the cutting can be achieved.

This problem is solved by using a laser as the cutting device.

The invention offers the advantage that such a laser can be actuated very rapidly and that as a result the cutting of the filling can be carried out in a fraction of a second. Moreover such a laser operates without mechanical components that are subject to wear, and consequently a predetermined precise cutting time can be maintained without effect of any wear. The design of the invention provides the further following advantage when the filling is made of a synthetic material, for instance a filament thread or one containing synthetic components. Such synthetic material will be slightly fused when cut so that the fibers of the filament threads of the cut ends are bonded to one another. This feature is especial advantageous in airjet looms. In airjet looms there is a danger that the filling that is kept ready in a main blowing nozzle may fray in the vicinity of its end or may unravel. If this occurs, problems will arise during the subsequent filling insertion because of the increased danger of catching of the fibers on the teeth of the reed. Also, the appearance of fabric edge opposite the insertion side would then be degraded. Therefore the invention provides an advantage with respect to airjet looms. As regards other machinery, for instance gripper looms, the invention also offers substantial advantages, in particular with regard to the accurate determination of the time of cutting.

Cutting systems in the form of lasers are basically known in the textile industry, for instance from the Italian patent 1,140,124, the Dutch patent 175,326 and the Japanese patent document 5 247 835 A. In the state of the art, however cutting systems in the form of lasers are used for fabric-severing or for loop-cutting by the forming of felt cloth.

In a further embodiment of the invention, the cutting laser shall be fitted with an optical system that converts an emitted laser beam into a flat beam.

In order that a low-energy laser shall suffice, its beam normally must be focused onto a comparatively small spot. As regards threads, such a requirement may entail problems because of the practical difficulty of precisely aligning a filling thread to be cut with the focus of the laser. This difficulty is circumvented by transforming the laser beam into a flat beam. The flat beam may be positioned so that its width direction shall run transversely to that of the thread, and accordingly positioning the thread and/or the laser will not raise problems.

Further features and advantages of the invention will be evident from the description below and from the illustrative embodiment shown in the drawing.

Figure 2:
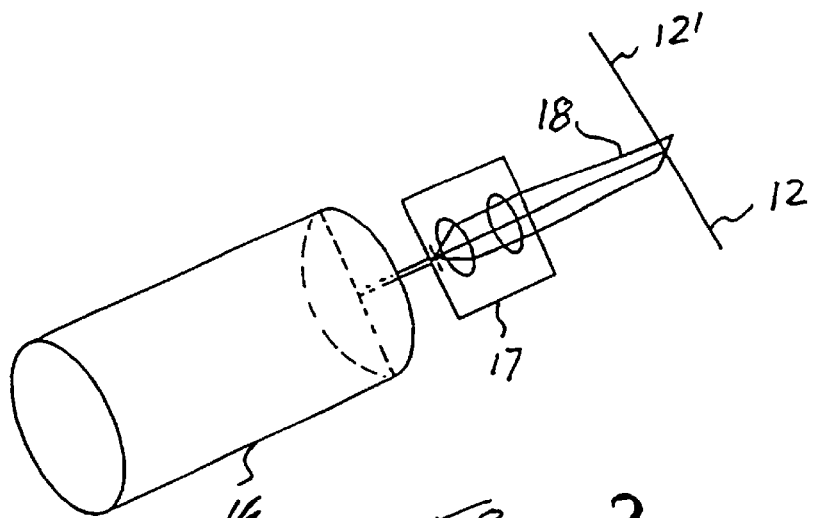

FIG. 1 is a schematic view of an airjet loom fitted with a cutting system of the invention, and FIG. 2 shows a laser with an optical system converting a laser beam into a flat beam.

A fabric 10 is woven from warp threads 11 and filling threads 12 on a weaving machine shown in very schematic form in FIG. 1. In a manner not shown in detail, the warp threads 11 are periodically raised and lowered by shed-forming elements in order to form sheds into which the fillings 12 may be inserted. Following insertion, the filling thread 12 is beaten by a reed 13 against the fabric edge or fell line. The reed 13 is mounted on a batten profile 14 of the batten beam that pivots to-and-fro. In the embodiment as shown, a main blowing nozzle 15 is mounted on the batten beam profile 14 that accompanies the to-and-fro pivoting motion of the reed 13. The main blowing nozzle is shown in much simplified form. In practice, preferably two consecutively mounted main blowing nozzles will be used. Relay nozzles are mounted in a distributed manner in a transverse direction across the reed 13 and these relay nozzles are supplied with compressed air to help transport the filling threads within the shed to the opposite side.

By means of a cutting system 16, the inserted filling thread 12 beaten against the fell line is cut from the filling thread segment 12' remaining within the main blowing nozzle 15. Thereupon the reed 13 and the main blowing nozzle 15 together with the filling 12' will pivot backward. As soon as a new shed has been opened, a new filling insertion takes place, and this time the filling thread 12' will be inserted. As already stated above, the weaving machine is shown in a very simplified manner. In practice several main blowing nozzles 15 are normally used in an adjoining and superposed manner in order to insert several filling threads of different types and/or colors. A number of main blowing nozzles may be used even when only identical fillings are inserted, for example to increase the operational rate.

The end of the filling 12' currently being kept ready is situated within a moving air stream. The purpose of this air stream is to support the ready filling 12' in such a way that it cannot recoil back out of the main nozzle 15. While this air stream holding the filling 12' is weaker than that used to insert it, this weaker air stream nevertheless may tend to unravel the end of the ready filling 12', especially if there should be a weaving pause. This phenomenon is especially troubling when the filling threads are filament threads having no or little twist. Such filament threads for example, consist of a plurality of thin individual filaments extending parallel against each other and being fused together at distinct, spaced locations. Such a filament thread may unravel in the vicinity of its end and thus there is a danger that when it is inserted into the shed, it will snag on the reed's teeth. Also, this phenomenon produces an unattractive appearance of the woven fabric at the side of the cloth opposite the insertion side.

To circumvent the above drawbacks, the cutting system 16 is provided with a pulsed laser cutting system. This laser, which is pulsed, may be a solid-state laser or preferably a gas laser and it cuts the filling in a very short time. During cutting, a comparatively large heat is dissipated and melts synthetic threads or synthetic components, whereby the ends of the fibers or filaments may be fused together. Even though the blowing air which continues being expelled from the main blow nozzle 15 causes rapid cooling, the intense heat generated by the laser will nevertheless induce melting. Accordingly the end of the ready filling thread 12' shall remain united.

Moreover, the laser cutting system has the advantage of rapid response time and very quick cutting of the filling thread. As a result, the cutting procedure can be timed very accurately in relation to operating requirements. This feature also is advantageous when applied to other types of weaving machines, for instance, gripper looms. As regards gripper looms, an inserted filling thread may be severed from a ready filling thread only after it has been seized and carried along by the gripper for further insertion. It is important in this respect that the time of cutting be very precisely matched to that time at which the filling thread is clamped onto and carried along by the gripper for its insertion.

The laser cutting beam is tightly focused in order to minimize laser power consumption as much as possible. Illustratively such minimization can be implemented using an optical system including spherical focusing lens elements. On the other hand, point-focusing creates a problem in positioning the laser because the filling thread has a relatively small diameter. Accordingly, an optical system 17 of special lens elements may be used, for example a cylindrical lense. Such optical system 17 converts the laser beam into a flat beam 18. The flat beam 18 is oriented in such a way that its length direction runs transversely to the longitudinal axis of the filling thread 12, 12' to be cut.

The laser system 16 offers still another advantage in that the distance between the main blowing nozzle 15 and the reed 13 may be kept comparatively small because the laser cutting beam virtually requires no space. Still another advantage of the system 16 of the invention is the lack of moving parts that are susceptible to wear, and as a result lasting and accurate operation is assured.

What is claimed is:

1. A weaving machine comprising a system adapted to cut a filling thread which is kept ready for filling insertion from a filling thread already beaten into a fabric, said cutting system comprises a laser, wherein said laser is arranged to configure an emitted laser beam into a flat beam.

2. Weaving machine as claimed in claim 1, wherein the laser operates in pulsed manner.

3. Weaving machine as claimed in claim 1, wherein the weaving machine is an airjet loom.

4. Weaving machine as claimed in claim 1, wherein the weaving machine is a gripper loom.

5. The weaving machine according to claim 1, wherein the laser includes an optical system arranged to configure an emitted laser cutting beam into said flat beam.

* * * * *